United States Patent
Pinarbasi

(10) Patent No.: US 6,741,432 B2
(45) Date of Patent: May 25, 2004

(54) CURRENT PERPENDICULAR TO THE PLANES (CPP) SPIN VALVE SENSOR WITH IN-STACK BIASED FREE LAYER AND SELF-PINNED ANTIPARALLEL (AP) PINNED LAYER STRUCTURE

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 10/104,432

(22) Filed: Mar. 21, 2002

(65) Prior Publication Data

US 2003/0179514 A1 Sep. 25, 2003

(51) Int. Cl.[7] ................................. G11B 5/39
(52) U.S. Cl. ................................. 360/324.11
(58) Field of Search ............ 360/324.11, 324.1 L, 360/324.1, 324.2, 319

(56) References Cited

U.S. PATENT DOCUMENTS

| | | | |
|---|---|---|---|
| 5,465,185 A | 11/1995 | Heim et al. ............ 360/113 |
| 5,491,600 A | * 2/1996 | Chen et al. ............ 360/322 |
| 5,583,725 A | 12/1996 | Coffey et al. ............ 360/113 |
| 5,701,223 A | 12/1997 | Fontana, Jr. et al. ........ 360/113 |
| 5,768,069 A | 6/1998 | Mauri .................. 360/113 |
| 5,920,446 A | 7/1999 | Gill .................... 360/113 |
| 5,923,505 A | * 7/1999 | Kroes et al. ............ 360/327.22 |
| 6,023,395 A | 2/2000 | Dill et al. ............. 360/113 |
| 6,040,961 A | 3/2000 | Gill .................... 360/113 |
| 6,114,719 A | 9/2000 | Dill et al. ............. 257/295 |
| 6,117,569 A | 9/2000 | Lin et al. .............. 428/692 |
| 6,127,053 A | 10/2000 | Lin et al. .............. 428/692 |
| 6,191,926 B1 | * 2/2001 | Everitt et al. .......... 360/324.11 |
| 6,219,211 B1 | * 4/2001 | Gill ................... 360/324.11 |
| 6,222,707 B1 | * 4/2001 | Huai et al. ............ 360/324.1 |
| 6,313,973 B1 | 11/2001 | Fuke et al. ............ 360/324.1 |
| 6,317,297 B1 | * 11/2001 | Tong et al. ............ 360/314 |
| 6,438,026 B2 | * 8/2002 | Gillies et al. .......... 365/158 |
| 6,466,419 B1 | * 10/2002 | Mao .................... 360/324.12 |
| 6,473,279 B2 | * 10/2002 | Smith et al. ........... 360/324.12 |

* cited by examiner

Primary Examiner—A. J. Heinz
Assistant Examiner—Angel Castro
(74) Attorney, Agent, or Firm—Ervin F. Johnston

(57) ABSTRACT

A spin valve sensor has an antiparallel (AP) pinned layer structure which has ferromagnetic first and second AP pinned layers that are separated by an antiparallel coupling layer. The first and second AP pinned layers are self-pinned antiparallel with respect to one another without the assistance of an antiferromagnetic (AFM) pinning layer. The spin valve sensor further includes an in-stack longitudinal biasing layer structure which is magnetostatically coupled to the free layer for longitudinally biasing a magnetic moment of the free layer parallel to an air bearing surface and parallel to major planes of the layers of the sensor. The only AFM pinning layer employed is in the biasing layer structure so that when the magnetic spins of the AFM pinning layer are set the orientations of the magnetic moments of the AP pinned layer structure are not disturbed. First and second leads are connected to the sensor for conducting a sense current through the sensor perpendicular to major planes of the layers of the sensor.

25 Claims, 6 Drawing Sheets

CURRENT PERPENDICULAR TO THE PLANES (CPP) SPIN VALVE SENSOR WITH IN-STACK BIASED FREE LAYER AND SELF-PINNED ANTIPARALLEL (AP) PINNED LAYER STRUCTURE

BACKGROUND OF THE INVENTION

1. Field of the Invention

The present invention relates to a current perpendicular to the planes (CPP) spin valve sensor with an in-stack biased free layer and a self-pinned antiparallel (AP) pinned layer structure and, more particularly, to such a sensor with a biasing structure located in the sensor stack and within the track width of the sensor for longitudinally biasing the free layer.

2. Description of the Related Art

The heart of a computer is a magnetic disk drive which includes a magnetic disk, a slider that has read and write heads, a suspension arm and an actuator arm that swings the suspension arm to place the read and write heads adjacent selected circular tracks on the disk when the disk is rotating. The suspension arm biases the slider into contact with the surface of the disk or parks it on a ramp when the disk is not rotating but, when the disk rotates and the slider is positioned over the rotating disk, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic field signals to and reading magnetic field signals from the rotating disk. The read and write heads are connected to processing circuitry that operates according to a computer program to implement the writing and reading functions.

An exemplary high performance read head employs a current perpendicular to the planes (CPP) sensor for sensing the magnetic field signals from the rotating magnetic disk. The sensor includes a nonmagnetic electrically conductive or nonconductive layer sandwiched between a ferromagnetic pinned layer and a ferromagnetic free layer. An antiferromagnetic pinning layer typically interfaces the pinned layer for pinning the magnetic moment of the pinned layer 90° to an air bearing surface (ABS) wherein the ABS is an exposed surface of the sensor that faces the rotating disk. The sensor is located between ferromagnetic first and second shield layers. First and second leads, which may be the first and second shield layers, are connected to the sensor for conducting a sense current therethrough. The sense current is conducted perpendicular to the major thin film planes (CPP) of the sensor as contrasted to a CIP sensor where the sense current is conducted parallel to the major thin film planes (CIP) of the sensor. A magnetic moment of the free layer is free to rotate upwardly and downwardly with respect to the ABS from a quiescent or zero bias point position in response to positive and negative magnetic field signals from the rotating magnetic disk. The quiescent position of the magnetic moment of the free layer, which is parallel to the ABS, is when the sense current is conducted through the sensor without magnetic field signals from the rotating magnetic disk.

When the magnetic moments of the pinned and free layers are parallel with respect to one another the resistance of the sensor to the sense current (Is) is at a minimum and when their magnetic moments are antiparallel the resistance of the sensor to the sense current ($I_S$) is at a maximum. Changes in resistance of the sensor is a function of $\cos \theta$, where $\theta$ is the angle between the magnetic moments of the pinned and free layers. When the sense current ($I_S$) is conducted through the sensor, resistance changes, due to field signals from the rotating magnetic disk, cause potential changes that are detected and processed as playback signals. The sensitivity of the sensor is quantified as magnetoresistive coefficient dr/R where dr is the change in resistance of the sensor from minimum resistance (magnetic moments of free and pinned layers parallel) to maximum resistance (magnetic moments of the free and pinned layers antiparallel) and R is the resistance of the sensor at minimum resistance.

The first and second shield layers may engage the bottom and the top respectively of the CPP sensor so that the first and second shield layers serve as leads for conducting the sense current ($I_S$) through the sensor perpendicular to the major planes of the layers of the sensor. The read gap is the length of the sensor between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

Spin valve sensors are classified as a bottom spin valve sensor or a top spin valve sensor depending upon whether the pinned layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel. Spin valve sensors are still further classified as single or dual wherein a single spin valve sensor employs only one pinned layer and a dual spin valve sensor employs two pinned layers with the free layer structure located therebetween.

As stated hereinabove, a magnetic moment of the aforementioned pinned layer structure is typically pinned 90° to the ABS by the aforementioned antiferromagnetic (AFM) pinning layer. After forming the sensor, the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to ambient temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields not disturb the setting of the pinning layer.

A scheme for minimizing the aforementioned gap length between the first and second shield layers is to provide a self-pinned AP pinned layer structure. The self-pinned AP pinned layer structure eliminates the need for the aforementioned pinning layer which permits the read gap to be reduced by 120 Å when the pinning layer is platinum manganese (PtMn). In the self-pinned AP pinned layer structure each AP pinned layer has an intrinsic uniaxial anisotropy field and a magnetostriction uniaxial anisotropy field. The intrinsic uniaxial anisotropy field is due to the intrinsic magnetization of the layer and the magnetostriction uniaxial anisotropy field is a product of the magnetostriction of the layer and stress within the layer. A positive magnetostriction of the layer and compressive stress therein results in a magnetostriction uniaxial anisotropy field that can support an intrinsic uniaxial anisotropy field. The orientations of the magnetic moments of the AP pinned layers are set by an external field. This is accomplished without the aforementioned elevated temperature which is required to free the magnetic spins of the pinning layer.

If the self-pinning of the AP pinned layer structure is not sufficient, unwanted extraneous fields can disturb the orientations of the magnetic moments of the AP pinned layers or, in a worst situation, can reverse their directions. Accordingly, there is a strong-felt need to maximize the uniaxial magnetostriction anisotropy field while maintaining a high magnetoresistive coefficient dr/R of the spin valve sensor.

It is also important that the free layer be longitudinally biased parallel to the ABS and parallel to the major planes of the thin film layers of the sensor in order to magnetically stabilize the free layer. This is typically accomplished by first and second hard bias magnetic layers which abut first and second side surfaces of the spin valve sensor. Unfortunately, the magnetic field through the free layer between the first and second side surfaces is not uniform since a portion of the magnetization is lost in a central region of the free layer to the shield layers. This is especially troublesome when the track width of the sensor is submicron. End portions of the free layer abutting the hard bias layers are over-biased and become very stiff in their response to field signals from the rotating magnetic disk. The stiffened end portions can take up a large portion of the total length of a sub-micron sensor and can significantly reduce the amplitude of the sensor. It should be understood that a narrow track width is important for promoting the track width density of the read head. The more narrow the track width the greater the number of tracks that can be read per linear inch along a radius of the rotating magnetic disk. This further enables an increase in the magnetic storage capacity of the disk drive.

There is a need in the art for further reducing the gap length without sacrificing dr/R, reducing the stiffening of the magnetic moment of the free layer when longitudinally biased and obviating disturbance of any pinning layer.

SUMMARY OF THE INVENTION

An aspect of the invention is to provide an in-stack biasing structure, which is located within the track width of a current perpendicular to the planes (CPP) sensor, for longitudinally biasing the free layer of the sensor in a direction parallel to the ABS and parallel to the major planes of the layers of the sensor with a significantly reduced sensor stack thickness. In a preferred embodiment the biasing structure includes a ferromagnetic pinned layer and a nonmagnetic electrically conductive coupling layer which is located between and interfaces the pinned layer and the free layer so that the pinned and free layers are magnetically coupled. The biasing layer structure further includes an antiferromagnetic (AFM) pinning layer which is exchange coupled to the pinned layer for pinning a magnetic moment of the pinned layer parallel to the ABS and parallel to the major planes of the layers of the sensor. Because of the magnetic coupling between the pinned and free layers the free layer is uniformly biased from a first side surface to a second side surface. This biasing is more uniform than the aforementioned first and second hard bias layers adjacent the side surfaces of the free layer since the hard bias layers result in overbiasing end regions of the free layer and restricting the employment of narrow track width sensors. However, prior art in-stack biasing schemes have not been usable for narrow read gap read heads because they include two AFM pinning layers.

Another aspect of the invention is to provide a self-pinning antiparallel (AP) pinned layer structure without an AFM pinning layer pinning the AP pinned layer structure. The self-pinning is accomplished by uniaxial anisotropies of the AP pinned layers which are oriented perpendicular to the ABS and, in combination, self-pin the magnetic moments of the first and second AP pinned layers perpendicular to the ABS and antiparallel with respect to each other.

The use of the self-pinning scheme permits the employment of a single antiferromagnetic material, which material is used for the AFM pinning layer in the biasing structure. This is made possible by the fact that the AP pinned layer structure is self-biasing and does not require the AFM pinning layer. Accordingly, after fabricating the read head the magnetic spins of the AFM pinning layer in the biasing structure can be set by elevating the temperature at or near the blocking temperature of the AFM material in the presence of a field that is oriented parallel to the ABS and parallel to the major planes of the layers of the sensor. Upon removing the elevated temperature, the magnetic spins of the AFM pinning layer are set to pin the magnetic moment of the pinned layer parallel to the ABS and parallel to the planes of the layers of the sensor. This does not affect the perpendicular orientation of the AP pinned layers of the AP pinned layer structure since these layers are not pinned by an AFM pinning layer. The preferred AFM material for the pinning layer of the biasing structure is platinum manganese. Since there is no other AFM material that has the features of platinum manganese the fact that only one AFM pinning layer is required by the present invention is significant.

It should be noted that if the AP pinned layer structure was pinned by an AFM pinning layer that a selection would have to be made of the material for the pinning layer. If platinum manganese (PtMn), which is the material of choice, is employed for the pinning layer, platinum manganese would then be used for not only pinning the pinned layer but also for longitudinally biasing the free layer. If the pinning layer is reset, as described hereinabove, a subsequent reset of the biasing layer would disturb the resetting of the pinning layer. Assuming that both the AFM pinning layer and the biasing layers are platinum manganese, elevating the blocking temperature of platinum manganese in the presence of a field oriented parallel to the ABS and parallel to the major thin film planes of the layers in order to reset the biasing layers will reset the pinning layer also parallel to the ABS which is 90° from the required pinning direction. Alternatively, if platinum manganese is employed for the pinning layer and another AFM material is employed for the biasing layers with a lower blocking temperature, two problems accrue. The first problem is that there is no AFM material as suitable as platinum manganese for pinning or biasing layers and secondly, even though the setting of the AFM biasing layers may be at a temperature lower than the blocking temperature of platinum manganese, the magnetic spins of the platinum manganese pinning layer are still disturbed to some extent when the biasing layers are set, which setting lowers the exchange coupling between the pinning layer in the AP pinned layer structure. This means that the AP pinned layer structure is not as strongly pinned and the magnetic moment of the AP pinned layer structure may not return to its original pinned direction when the read head is subjected to thermal spikes in the presence of extraneous magnetic fields.

An object is to provide a CCP spin valve sensor with an AFM biased free layer and a self-biased AP pinned layer structure wherein amplitude output of the sensor is improved.

Another object is to improve the linear bit density of an in-stack biasing CPP sensor by reducing the stack height of the sensor.

A further object is to provide a method for making the aforementioned CPP spin valve sensor.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
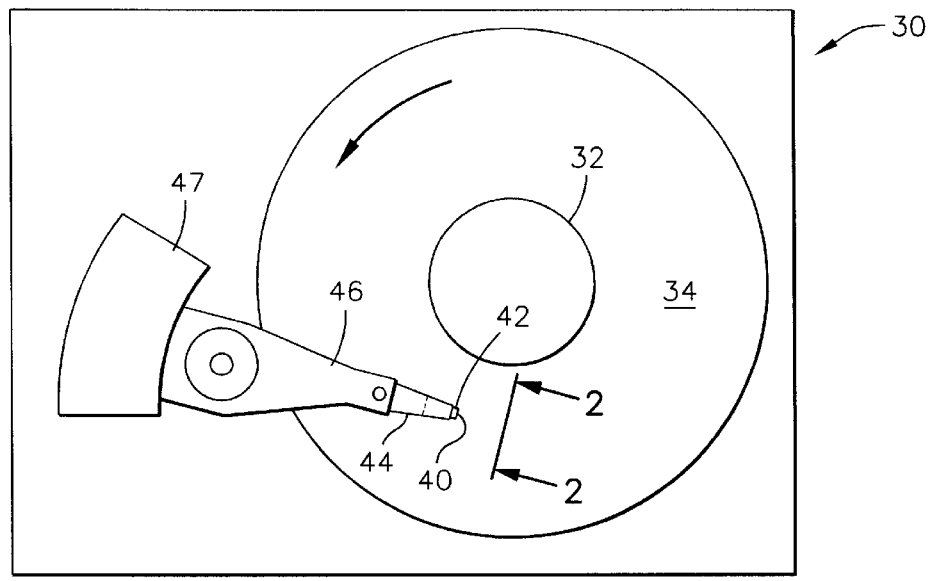
FIG. 1 is a plan view of an exemplary prior art magnetic disk drive.
Figure 2:
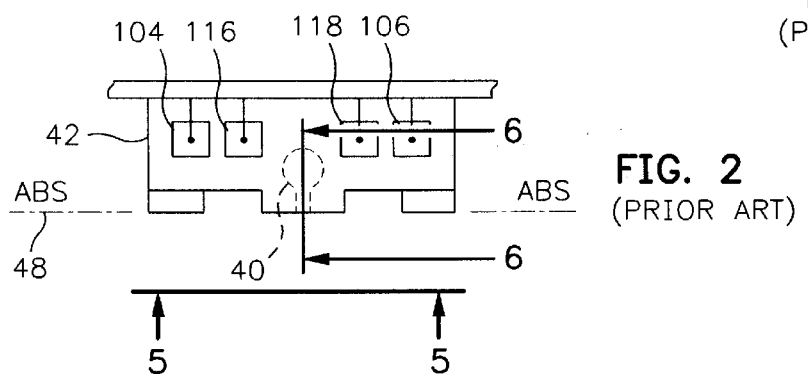
FIG. 2 is an end view of a slider with a magnetic head of the disk drive as seen in plane 2—2 of FIG. 1.
Figure 3:
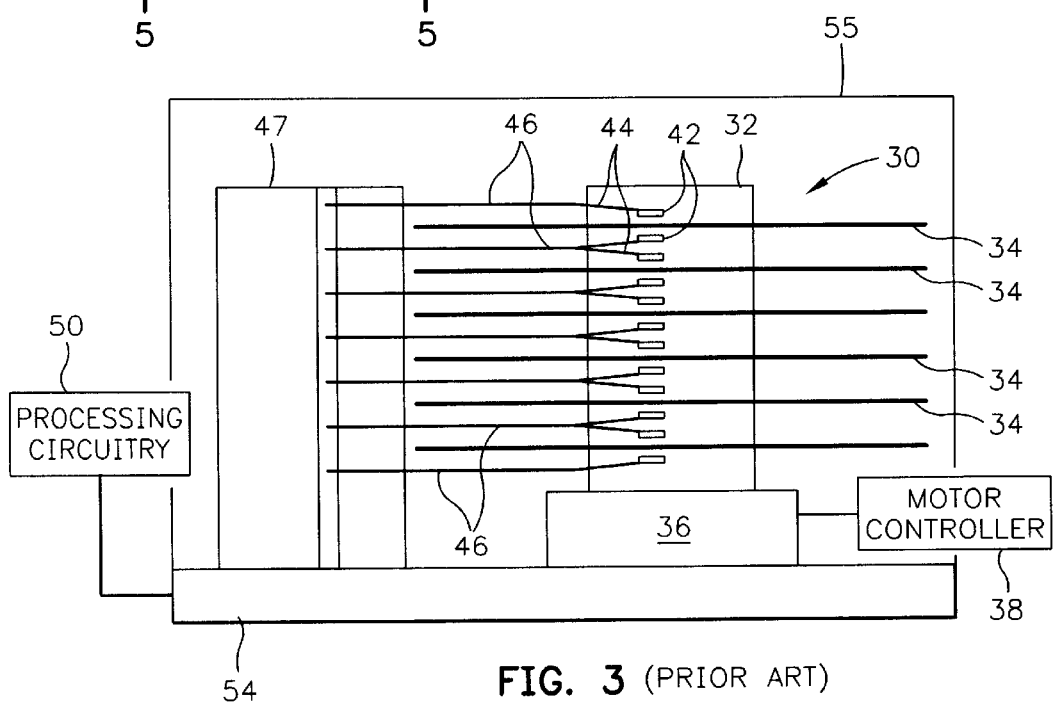
FIG. 3 is an elevation view of the magnetic disk drive wherein multiple disks and magnetic heads are employed.
Figure 4:
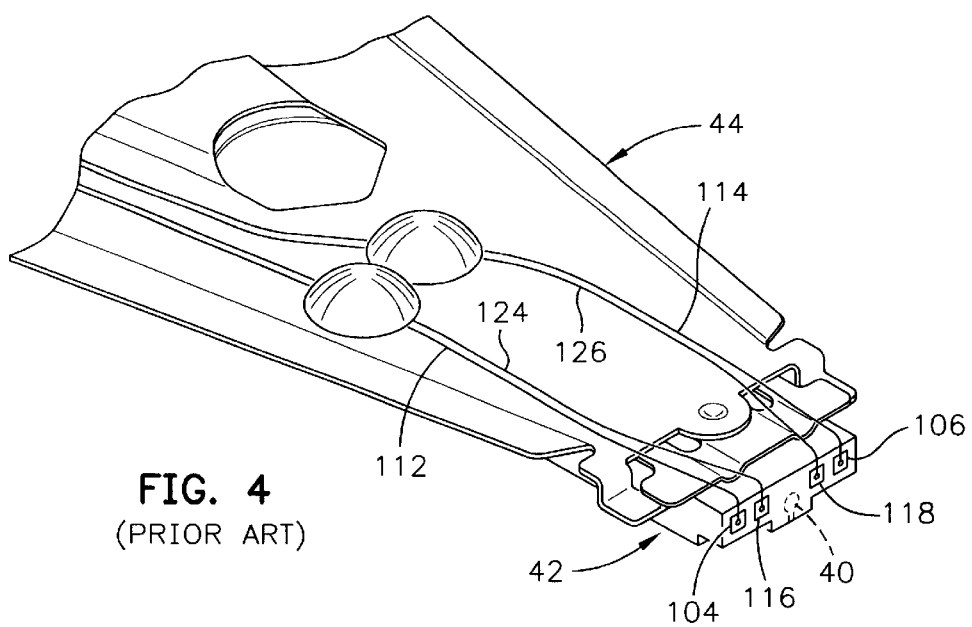
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
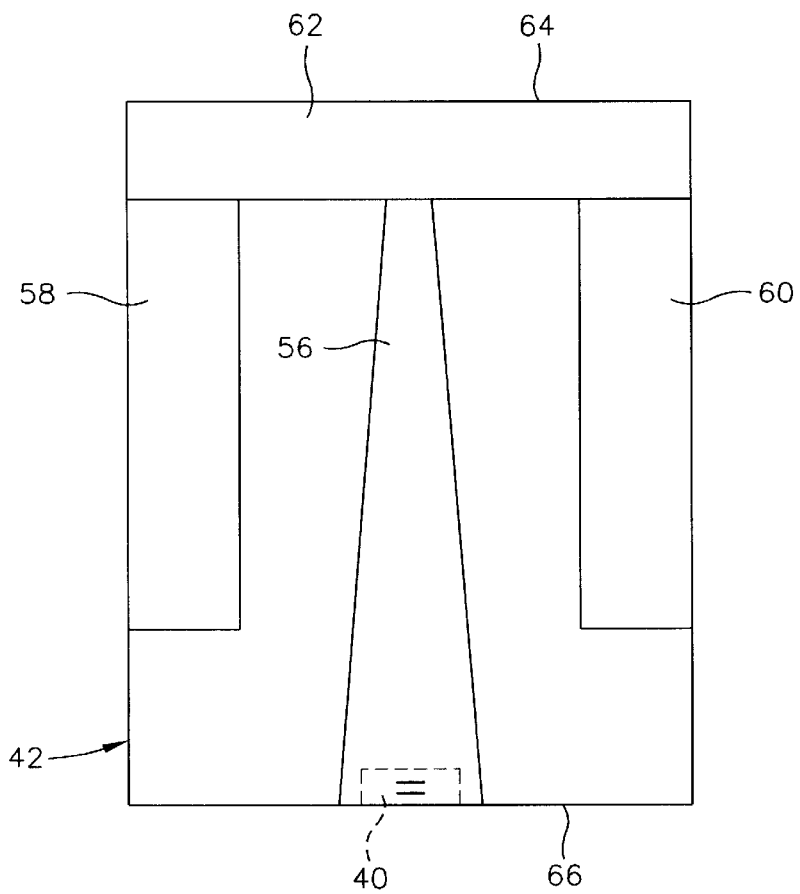
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
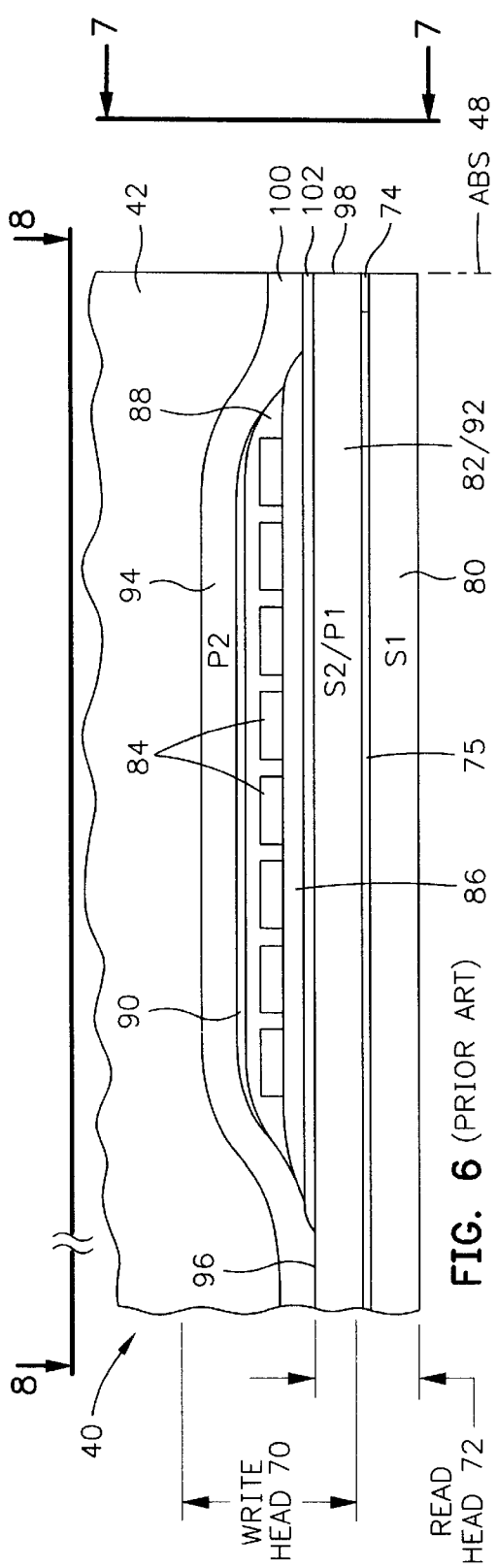
FIG. 6 is a partial view of the slider and a prior art merged magnetic head as seen in plane 6—6 of FIG. 2.
Figure 7:
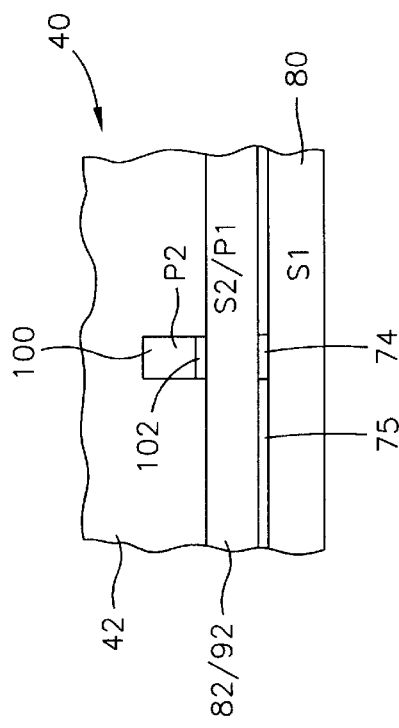
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between ferromagnetic first and second shield layers 80 and 82 which may serve as first and second leads connected to the processing circuitry 50 in FIG. 3 for conducting the sense current Is through the sensor perpendicular to major planes of the layers of the sensor. In response to external magnetic fields, the resistance of the spin valve sensor 74 changes. When the sense current $I_S$ is conducted through the sensor the resistance changes cause potential changes which are processed as readback signals by the processing circuitry 50 shown in FIG. 3.

Figure 8:
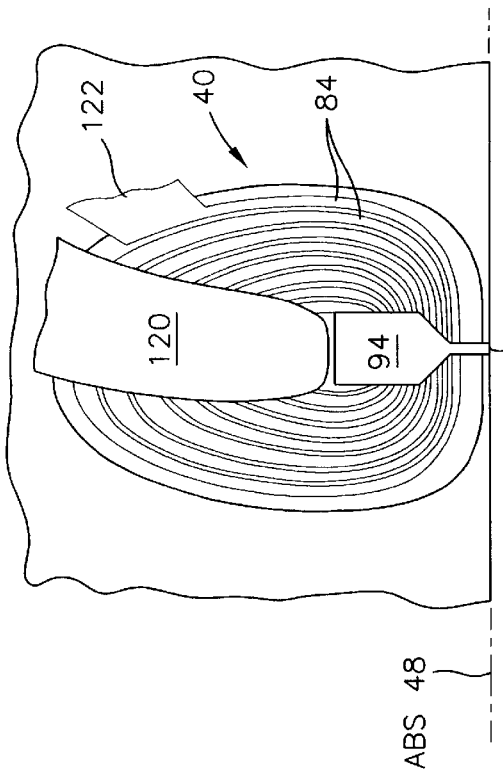
FIG. 8 is a view taken along plane 8—8 of FIG. 6 with all material above the coil layer and leads removed.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
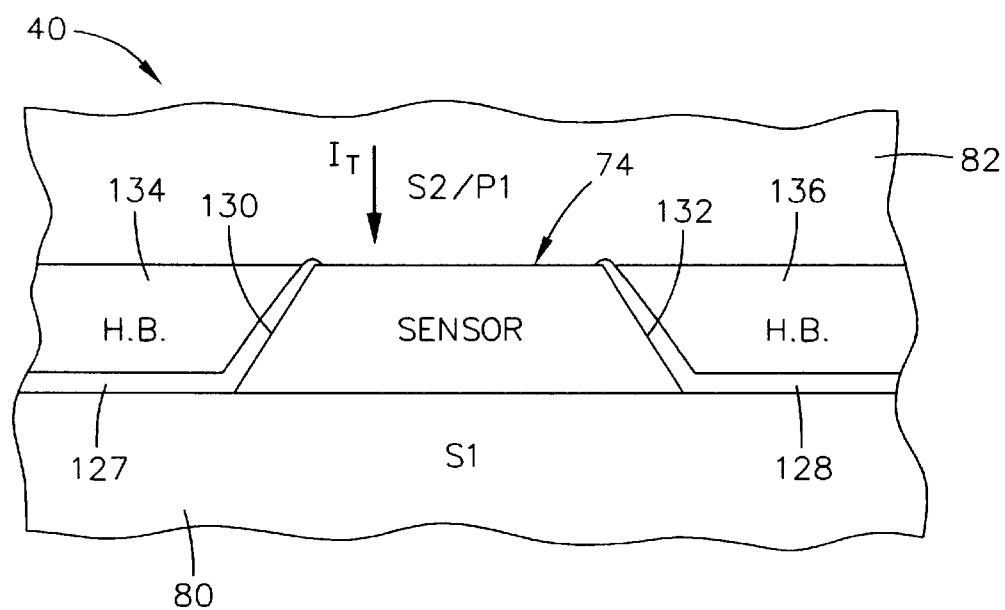
FIG. 9 is an enlarged isometric ABS illustration of a prior art read head with a CPP spin valve sensor.

FIG. 9 is an enlarged isometric ABS illustration of the prior art read head portion shown in FIG. 7. The read head includes the CPP sensor 74. First and second insulation layers 127 and 128, such as alumina ($Al_2O_3$), cover the first shield layer 80 on each side of the tunnel junction sensor 74 as well as slightly covering first and second side walls 130 and 132 of the sensor. First and second hard bias layers (H.B.) 134 and 136 are on the insulation layers 127 and 128 and are adjacent the side walls 130 and 132. The hard bias layers 134 and 136 cause magnetic fields to extend longitudinally through the sensor 74 for stabilizing the free layer. The sensor 74 and the first and second hard bias layers 134 and 136 are located between ferromagnetic first and second shield layers 80 and 82 which may serve as leads for conducting the sense current (Is) through the sensor 74.

Unfortunately, the first and second hard bias layers 134 and 136 in FIG. 9 do not uniformly stabilize the free layer within the sensor 74. Hard bias layers typically stiffen the magnetic moment of the free layer at end portions of the sensor abutting the hard bias layers so that these portions are stiff in their response to field signals from the rotating magnetic disk. With submicron track widths, this loss, which can be 0.1 μm in width at each end of the sensor, is unacceptable. Further, a central portion of the free layer may not be properly stabilized since magnetic flux is progressively drawn in by the first and second shield layers 80 and 82 as the flux lines from the hard bias layers extend between the side edges 138 and 139.

Figure 10:
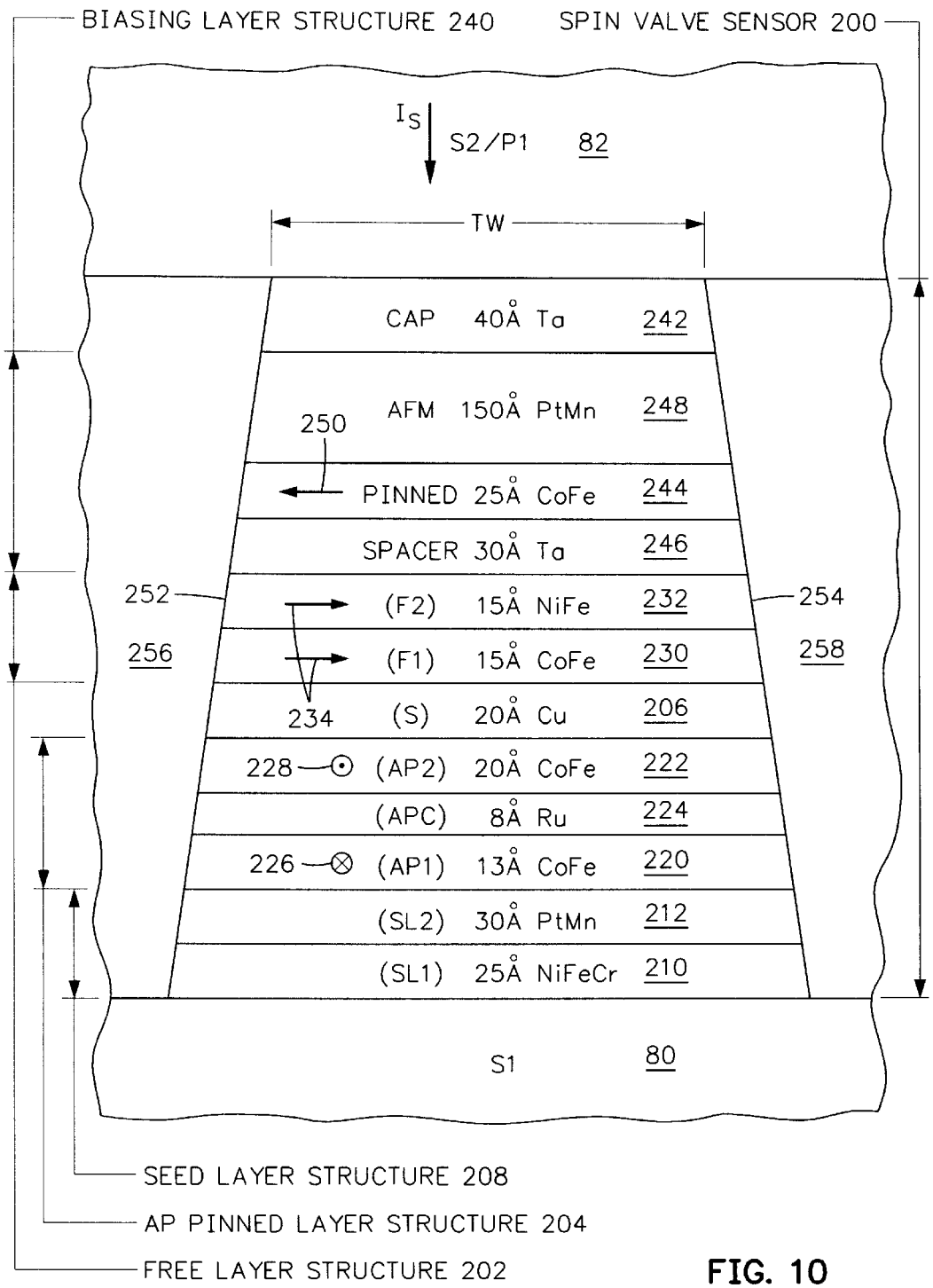
FIG. 10 is an ABS view of one embodiment of the present spin valve sensor.

The Invention One embodiment of the present CPP spin valve sensor 200 is illustrated in FIG. 10 wherein the spin valve sensor is located between the first and second shield layers 80 and 82 which serve as first and second lead layers. The first and second shield layers 80 and 82 conduct a sense current Is through the sensor perpendicular to the major planes of the layers of the sensor. The spin valve sensor 200 includes a free layer structure 202 and an antiparallel (AP) pinned layer structure 204. A nonmagnetic electrically conductive or nonconductive spacer layer (S) 206 is located between the free layer structure 202 and the AP pinned layer structure 204. Because the free layer structure 202 is located between the AP pinned layer structure 204 and the second shield layer 82 the spin valve sensor 200 is a bottom spin valve sensor. A seed layer structure 208 may be located between the first shield layer 80 and the AP pinned layer structure 204. The seed layer structure 208 may include first and second seed layers (SL1) and (SL2) 210 and 212. The seed layers, with the thicknesses and materials shown, have been found to promote a desirable texture of the layers deposited thereon.

It should be noted that the spin valve sensor 200 does not include the typical antiferromagnetic (AFM) pinning layer for pinning magnetic moments of the AP pinned layer structure 204. An aspect of the invention is to provide an AP pinned layer structure 204 which is self-pinning. The AP pinned layer structure 204 includes ferromagnetic first and second AP pinned layers (AP1) and (AP2) 220 and 222. A nonmagnetic electrically conductive antiparallel coupling (APC) layer 224 is located between and interfaces the first and second AP pinned layers 220 and 222. The first AP pinned layer 220 has a magnetic moment 226 which is oriented perpendicular to the ABS in a direction, either toward the ABS or away from the ABS, as shown in FIG. 10, and the second AP pinned layer has a magnetic moment 228 which is oriented antiparallel to the magnetic moment 226 by a strong antiparallel coupling between the first and second AP pinned layers 220 and 222. The preferred material for the first and second AP pinned layers 220 and 222 is cobalt iron (CoFe).

In a preferred embodiment, one of the AP pinned layers is thicker than the other, such as the first AP pinned layer 220 may be 13 Å and the second AP pinned layer 222 may be 20 Å. The direction of the magnetic moment 228, either into or out of the sensor, is determined by the direction in which the magnetic moment 228 is set by an external magnetic field. With the arrangement shown in FIG. 10, the magnetic field has been applied out of the sensor which causes the magnetic moment 228 to be directed out of the sensor. If the external field is reversed in its direction, the magnetic moment 228 would be directed into the sensor. In another embodiment the first AP pinned layer 220 may be thicker than the second AP pinned layer 222. When the AP pinned layers 220 and 222 are formed by sputter deposition they are deposited in the presence of a field which is oriented perpendicular to the ABS. In this manner, the easy axes of the first and second AP pinned layers will be likewise oriented perpendicular to the ABS.

The free layer structure 202 may include first and second free layers (F1) and (F2) 230 and 232. It has been found that when the free layer structure 202 has a cobalt iron first free layer 230 between the spacer layer 206 and a nickel iron second free layer 232 that the magnetoresistive coefficient dRIR of the spin valve sensor is increased. The free layer structure has a magnetic moment 234 which is oriented parallel to the ABS and parallel to the major thin film planes of the layers. When a field signal from the rotating magnetic disk rotates the magnetic moment 234 into the sensor the magnetic moments 234 and 228 become more antiparallel which increases the resistance of the sensor to the sense current $I_S$ and when a field signal rotates the magnetic moment 234 out of the sensor the magnetic moments 234 and 228 become more parallel which decreases the resistance of the sensor to the sense current $I_S$. These resistance changes cause potential changes within the processing circuitry 50 in FIG. 3 which are processed as playback signals.

An in-stack biasing layer structure 240 is located within the stack of the spin valve sensor and within the track width of the sensor for longitudinally biasing the magnetic moment 234 of the free layer structure parallel to the ABS and parallel to the major planes of the layers of the sensor, which planes define the thicknesses of the layers. A cap layer 242 is located on the biasing layer structure for protecting it from subsequent processing steps. The biasing layer structure 240 may include a ferromagnetic pinned layer 244 and a nonmagnetic electrically nonconductive spacer layer 246 which is located between and interfaces the free layer structure 202 and the pinned layer 244. The biasing layer structure 244 may further include an antiferromagnetic (AFM) pinning layer 248 which interfaces and is exchange coupled to the pinned layer 244 for pinning a magnetic moment 250 of the pinned layer parallel to the ABS and parallel to the major thin film planes of the layers of the sensor. Because of the spacer layer 246 the pinned layer 244 is magnetostatically coupled to the free layer structure 202 so there is flux closure therebetween. This causes a longitudinal biasing of the free layer structure 202 for stabilizing its magnetism, which stabilization is uniform between the side surfaces 252 and 254. This overcomes the problem of the aforementioned stiffening of the end regions of the free layer structure which limits narrow track width sensors. Insulation layers 256 and 258 contact the side surfaces 252 and 254 for preventing shunting of the sense current $I_S$.

It should be noted that without an AFM pinning layer for the AP pinned layer structure that the setting of the magnetic spins of the AFM layer 248 will not cause a disturbance of the operation of the AP pinned layer structure. This then enables the use of a single AFM material for the sensor. Since platinum manganese (PtMn) is a material of choice and since there are no other satisfactory AFM materials, the present invention enables the use of platinum manganese (PtMn) as the single AFM material employed in the read head.

Figure 11:
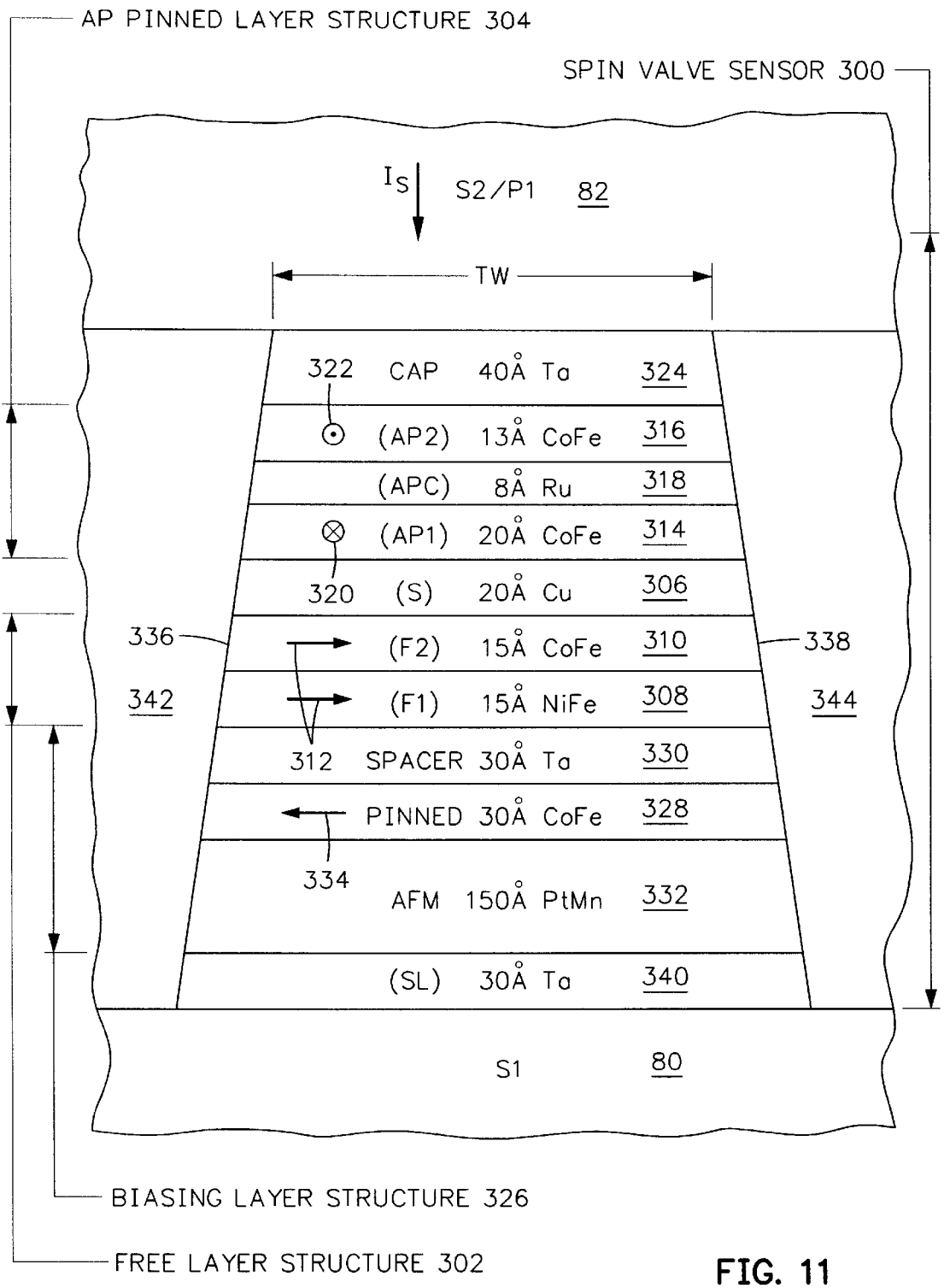
FIG. 11 is an ABS view of another embodiment of the present spin valve sensor.

Another embodiment of the present spin valve sensor 300 is illustrated in FIG. 11. The spin valve sensor 300 includes a free layer structure 302, an antiparallel (AP) pinned layer structure 304 and a nonmagnetic electrically conductive spacer layer (S) 306 which is located between and interfaces the free layer structure 302 and the AP pinned layer structure 304. The free layer structure 302 may have first and second free layers (F1) and (F2) 308 and 310 with the first free layer 308 being nickel iron and the second free layer 310 being cobalt iron with the second free layer 310 interfacing the spacer layer 306 for improving the magnetoresistive coefficient dR/R of the sensor. The free layer structure 302 has a magnetic moment 312 which is parallel to the ABS and parallel to the major planes of the sensor in a direction from right to left or from left to right, as shown in FIG. 11.

The AP pinned layer structure 304 includes ferromagnetic first and second AP pinned layers (AP1) and (AP2) 314 and 316 and an antiparallel coupling (APC) layer 318 which is located between and interfaces the first and second AP pinned layers 314 and 316. The AP pinned layers 314 and 316 have magnetic moments 320 and 322 which are oriented perpendicular to the ABS and antiparallel with respect to one another. The first and second AP pinned layers 314 and 316 have uniaxial anisotropies that cause a self-pinning between the first and second AP pinned layers. Since the first AP pinned layer 314 is magnetically thicker than the second AP pinned layer 316 it has a greater magnetic moment and will dominate the directions of the magnetic moments 320 and 322. The operation of the spin valve sensor 300 in response to field signals from the rotating magnetic disk is the same as that described hereinabove for the spin valve sensor 200 in FIG. 10. A cap layer 324 may be located on the AP pinned layer structure 304 for protecting it from subsequent processing steps.

An in-stack biasing layer structure 326 is located in the stack of the sensor and within the track width for longitudinally biasing the magnetic moment 312 of the free layer structure 302. The biasing layer structure 326 may include a ferromagnetic pinned layer 328 and a nonmagnetic electrically conductive spacer layer 330 which is located between and interfaces the pinned layer 328 and the free layer structure 302. An antiferromagnetic (AFM) pinning layer 332 interfaces and is exchange coupled to the pinned layer 328 for pinning a magnetic moment 334 of the pinned layer parallel to the ABS and parallel to the planes of the layers of the sensor. The spacer 330 causes the pinned layer 328 and the free layer structure 302 to be magnetostatically coupled so that there is flux closure therebetween. Accordingly, the magnetic moment 334 aligns the magnetic moment 312 of the free layer structure parallel to the ABS and parallel to the major planes of the sensor as shown in FIG. 11. This biasing is uniform from a first side surface 336 to a second side surface 338 of the free layer structure so that the biasing does not cause a limitation on narrow track width sensors. A seed layer (SL) 340 may be located between the first shield layer 80 and the pinning layer 332 for promoting improved texture of the layers deposited thereon. Insulation layers 342 and 344 contact the side surfaces 336 and 338 for preventing shunting of the sense current Is through the sensor 300.

Exemplary thicknesses and materials of the layers are 30 Å of Ta for the layer 340, 150 Å of PtMn for the layer 332, 30 Å of CoFe for the layer 328, 30 Å of Ta for the layer 330, 15 Å of NiFe for the layer 308, 15 Å of CoFe for the layer 310, 20 Å of Cu for the layer 306, 20 Å of CoFe for the layer 314, 8 Å of Ru for the layer 318, 13 Å of CoFe for the layer 316 and 40 Å of Ta for the layer 324.

Discussion

It has been found that by removing the pinning layer for pinning a magnetic moment of the AP pinned layer that the amplitude read output of the read head can be increased 30% to 40%. Further, by uniformly stabilizing the free layer structure the amplitude is still further increased and the stack height of the read head can be made less to increase the linear read bit density of the read head. This improved sensor is intended to be employed in the read head 40 shown in FIG. 6 and the magnetic disk drive shown in FIG. 3.

The following commonly assigned U.S. patents are incorporated in their entirety by reference herein: (1) U.S. Pat. No. 5,465,185; (2) U.S. Pat. No. 5,583,725; (3) U.S. Pat. No. 5,768,069; (4) U.S. Pat. No. 6,040,961; (5) U.S. Pat. No. 6,117,569; (6) U.S. Pat. No. 6,127,053; and (7) U.S. Pat. No. 6,219,211 B1.

Clearly, other embodiments and modifications of this invention will occur readily to those of ordinary skill in the art in view of these teachings. For instance, the slider supporting the sensor may have a head surface other than the aforementioned ABS, such as a tape surface for use in a tape drive. Therefore, this invention is to be limited only by the following claims, which include all such embodiments and modifications when viewed in conjunction with the above specification and accompanying drawings.

I claim:

1. A magnetic head assembly, that has a head surface for facing a magnetic medium, comprising:
   a read head that includes a spin valve sensor the spin valve sensor including:
      an antiparallel (AP) pinned layer structure;
      a ferromagnetic free layer having a magnetic moment that is free to rotate in response to a field signal; and
      a nonmagnetic electrically conductive spacer layer located between the free layer and the AP pinned layer structure;
   the antiparallel (AP) pinned layer structure including:
      ferromagnetic first and second antiparallel (AP) pinned layers;
      an antiparallel coupling (APC) layer located between and interfacing the first and second AP pinned layers;
      the first and second AP pinned layers self pinning one another without assistance of an antiferromagnetic (AEM) pinning layer or magnetic fields generated by a sense current; and
   an in-stack longitudinal biasing layer structure located within a track width of the sensor and magnetostatically coupled to the free layer for longitudinal biasing the magnetic moment of the free layer parallel to the head surface and parallel to major planes of the layers of the sensor; and
   first and second leads connected to the sensor for conducting a current through the sensor perpendicular to major planes of the layers of the sensor.

2. A magnetic head assembly as claimed in claim 1 wherein the biasing layer structure includes:
   a ferromagnetic pinned layer that has a magnetic moment;
   a nonmagnetic electrically conductive coupling layer located between and interfacing the pinned layer and the free layer so that the pinned layer and the free layer are only magnetostatically coupled; and
   an antiferromagnetic (AFM) pinning layer exchange coupled to the pinned layer for pinning the magnetic moment of the pinned layer parallel to the head surface and parallel to the major planes of the layers of the sensor.

3. A magnetic head assembly as claimed in claim 2 wherein the AFM pinning layer is platinum manganese (PtMn).

4. A magnetic head assembly as claimed in claim 3 wherein the coupling layer of the biasing layer structure is tantalum (Ta).

5. A magnetic head assembly as claimed in claim 1 including:
ferromagnetic first and second shield layers; and
the spin valve sensor being located between the first and second shield layers.

6. A magnetic head assembly as claimed in claim 5 further comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

7. A magnetic head assembly as claimed in claim 6 wherein the free layer is located between the AP pinned layer structure and the first pole piece layer.

8. A magnetic head assembly as claimed in claim 6 wherein the AP pinned layer structure is located between the free layer and the first pole piece layer.

9. A magnetic head assembly, that has a head surface for facing a magnetic medium, comprising:
a read head that includes a spin valve sensor;
the spin valve sensor including:
an antiparallel (AP) pinned layer structure;
a ferromagnetic free layer having a magnetic moment that is free to rotate in response to a field signal; and
a nonmagnetic electrically conductive spacer layer located between the free layer and the AP pinned layer structure;
the antiparallel (AP) pinned layer structure including:
ferromagnetic first and second antiparallel (AP) pinned layers;
an antiparallel coupling (APC) layer located between and interfacing the first and second AP pinned layers;
the first and second AP pinned layers self pinning one another without assistance of an antiferromagnetic (AFM) pinning layer or magnetic fields generated by a sense current; and
an in-stack longitudinal biasing layer structure located within a track width of the sensor and magnetostatically coupled to the free layer for longitudinal biasing the magnetic moment of the free layer parallel to the head surface and parallel to major planes of the layers of the sensor; and
first and second leads connected to the sensor for conducting a current through the sensor perpendicular to major planes of the layers of the sensor;
the biasing layer structure including:
a ferromagnetic pinned layer that has a magnetic moment;
a nonmagnetic electrically conductive coupling layer located between and interfacing the pinned layer and the free layer so that the pinned layer and the free layer are only magnetostatically coupled; and
an antiferromagnetic (AFM) pinning layer exchange coupled to the pinned layer for pinning the magnetic moment of the pinned layer parallel to the head surface and parallel to the major planes of the layers of the sensor.

10. A magnetic head assembly as claimed in claim 9 wherein:

the AEM pinning layer is platinum manganese (PtMn); and
the coupling layer of the biasing layer structure is tantalum (Ta).

11. A magnetic disk drive including at least one magnetic head assembly that has a head surface for facing a magnetic medium and that includes a write head and a read head, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
the read head including:
ferromagnetic first and second shield layers; and
a spin valve sensor located between the first and second shield layers;
the spin valve sensor including:
an antiparallel (AP) pinned layer structure;
a ferromagnetic free layer having a magnetic moment that is free to rotate in response to a field signal; and
a nonmagnetic electrically conductive spacer layer located between the free layer and the AP pinned layer structure;
the antiparallel (AP) pinned layer structure including:
ferromagnetic first and second antiparallel (AP) pinned layers;
an antiparallel coupling (APC) layer located between and interfacing the first and second AP pinned layers;
the first and second AP pinned layers self pinning one another without assistance of an antiferromagnetic (AFM) pinning layer or magnetic fields generated by a sense current; and
an in-stack longitudinal biasing layer structure located within a track width of the sensor and magnetostatically coupled to the free layer for longitudinal biasing the magnetic moment of the free layer parallel to the ABS and parallel to major planes of the layers of the sensor;
first and second leads connected to the sensor for conducting a current through the sensor perpendicular to major planes of the layers of the sensor;
a housing;
the magnetic medium being supported in the housing;
a support mounted in the housing for supporting the magnetic head assembly with said head surface facing the magnetic medium so that the magnetic head assembly is in a transducing relationship with the magnetic medium;
a motor for moving the magnetic medium; and
a processor connected to the magnetic head assembly and to the motor for exchanging signals with the magnetic head assembly and for controlling movement of the magnetic medium.

12. A magnetic disk drive as claimed in claim 11 wherein the free layer is located between the AP pinned layer structure and the first pole piece layer.

13. A magnetic disk drive as claimed in claim 11 wherein the AP pinned layer structure is located between the free layer and the first pole piece layer.

14. A magnetic disk drive as claimed in claim 11 wherein the biasing layer structure includes:
   a ferromagnetic pinned layer that has a magnetic moment;
   a nonmagnetic electrically conductive coupling layer located between and interfacing the pinned layer and the free layer so that the pinned layer and the free layer are only magnetostatically coupled; and
   an antiferromagnetic (AEM) pinning layer exchange coupled to the pinned layer for pinning the magnetic moment of the pinned layer parallel to the ABS and parallel to the major planes of the layers of the sensor.

15. A magnetic disk drive as claimed in claim 14 wherein:
   the AFM pinning layer is platinum manganese (PtMn); and
   the coupling layer of the biasing layer structure is tantalum (Ta).

16. A method of making a magnetic head assembly, which has a head surface for facing a magnetic medium, comprising the steps of:
   forming a read head that includes a spin valve sensor;
   a making of the spin valve sensor including the steps of:
      forming an antiparallel (AP) pinned layer structure;
      forming a ferromagnetic free layer that has a magnetic moment that is free to rotate in response to a field signal; and
      forming a nonmagnetic electrically conductive spacer layer between the free layer and the AP pinned layer structure;
   the forming of the antiparallel (AP) pinned layer structure including the steps of:
      forming ferromagnetic first and second antiparallel (AP) pinned layers;
      forming an antiparallel coupling (APC) layer between and interfacing the first and second AP pinned layers;
      the first and second AP pinned layers being further formed to self pin one another without assistance of an antiferromagnetic (AFM) pinning layer or magnetic fields generated by a sense current; and
      forming an in-stack longitudinal biasing layer structure within a track width of the sensor and magnetostatically coupled to the free layer for longitudinal biasing the magnetic moment of the free layer parallel to the head surface and parallel to major planes of the layers of the sensor;
   forming first and second leads connected to the sensor for conducting a current through the sensor perpendicular to major planes of the layers of the sensor.

17. A method as claimed in claim 16 wherein a making of the biasing layer structure includes the steps of:
   forming a ferromagnetic pinned layer that has a magnetic moment;
   forming a nonmagnetic electrically conductive coupling layer between and interfacing the pinned layer and the free layer so that the pinned layer and the free layer are only magnetostatically coupled; and
   forming an antiferromagnetic (AFM) pinning layer exchange coupled to the pinned layer for pinning the magnetic moment of the pinned layer parallel to the head surface and parallel to the major planes of the layers of the sensor.

18. A method as claimed in claim 17 wherein the AFM pinning layer is formed of platinum manganese (PtMn).

19. A method as claimed in claim 18 wherein the coupling layer of the biasing layer structure is formed of tantalum (Ta).

20. A method of making a magnetic head assembly as claimed in claim 16 including the step of:
   forming ferromagnetic first and second shield layers with the spin valve sensor located therebetween.

21. A method of a making magnetic head assembly as claimed in claim 20 further comprising the steps of:
   making a write head including the steps of:
      forming ferromagnetic first and second pole piece layers in pole tip, yoke and back gap regions wherein the yoke region is located between the pole tip and back gap regions;
      forming a nonmagnetic electrically nonconductive write gap layer between the first and second pole piece layers in the pole tip region;
      forming an insulation stack with at least one coil layer embedded therein between the first and second pole piece layers in the yoke region; and
      connecting the first and pole piece layers at said back gap region.

22. A method as claimed in claim 21 wherein the free layer is formed between the AP pinned layer structure and the first pole piece layer.

23. A method as claimed in claim 21 wherein the AP pinned layer structure is formed between the free layer and the first pole piece layer.

24. A method as claimed in claim 21 wherein a making of the biasing layer structure includes the steps of:
   forming a ferromagnetic pinned layer that has a magnetic moment;
   forming a nonmagnetic electrically conductive coupling layer between and interfacing the pinned layer and the free layer so that the pinned layer and the free layer are only magnetostatically coupled; and
   forming an antiferromagnetic (AFM) pinning layer exchange coupled to the pinned layer for pinning the magnetic moment of the pinned layer parallel to the head surface and parallel to the major planes of the layers of the sensor.

25. A method as claimed in claim 24 wherein:
   the AFM pinning layer is formed of platinum manganese (PtMn); and
   the coupling layer of the biasing layer structure is formed of tantalum (Ta).

* * * * *